United States Patent
Kim et al.

(10) Patent No.: US 7,203,501 B2
(45) Date of Patent: Apr. 10, 2007

(54) APPARATUS AND METHOD FOR DETERMINING POSITION INFORMATION OF A MOBILE STATION

(75) Inventors: Wuk Kim, Namyangju-shi (KR); Hak-Ryoul Kim, Songnam-shi (KR); Jin-Won Kim, Tongjak-gu (KR); Jang-Gyu Lee, Yongdungpo-gu (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 302 days.

(21) Appl. No.: 10/640,664

(22) Filed: Aug. 14, 2003

(65) Prior Publication Data
US 2004/0110514 A1 Jun. 10, 2004

(30) Foreign Application Priority Data
Aug. 14, 2002 (KR) ...................... 10-2002-0047981

(51) Int. Cl.
*H04Q 7/20* (2006.01)
(52) U.S. Cl. ................. 455/456.1; 455/456.2; 455/456.6; 455/456.5; 370/332; 342/357.06; 342/357.01
(58) Field of Classification Search ............. 455/456.1, 455/456.6, 456.5, 67.3; 370/332
See application file for complete search history.

(56) References Cited

U.S. PATENT DOCUMENTS 6,408,186 B1 * 6/2002 Park et al. ............... 455/456.1
6,445,927 B1 * 9/2002 King et al. ............... 455/456.6
6,597,729 B1 * 7/2003 Schmidl et al. ............. 375/149
6,694,142 B1 * 2/2004 Kuwahara et al. ........ 455/456.1
2002/0038182 A1 * 3/2002 Wong et al. ................ 701/213

* cited by examiner

*Primary Examiner*—Temica Beamer
*Assistant Examiner*—Joy Contee
(74) *Attorney, Agent, or Firm*—Roylance, Abrams, Berdo & Goodman LLP (57) ABSTRACT

An apparatus and method for determining position information of a mobile station (MS). The apparatus directly estimates a propagation delay error by measuring a signal strength of a propagation signal for use in a mobile communication system, and reduces a MS position error. The apparatus reduces the MS position error by either combining the propagation signal for the mobile communication system with a GPS signal or using only the propagation signal. The apparatus receives Mobile Station (MS) position acquisition signals from the mobile communication system in order to estimate position information of the MS. The position signal acquisition unit receives the MS position acquisition signals, acquires a position signal from the received MS position acquisition signal, and outputs an acquired position signal. The primary position calculator calculates a primary position using the acquired position signal received from the position signal acquisition unit. The propagation delay error range setup unit determines a propagation delay error range using the acquired position signal. The propagation delay error estimator estimates a propagation delay error using the determined propagation delay error range and the primary position. The position calculator calculates a secondary position using the propagation delay error estimation value received and the calculated primary position.

22 Claims, 5 Drawing Sheets

APPARATUS AND METHOD FOR DETERMINING POSITION INFORMATION OF A MOBILE STATION

PRIORITY

This application claims priority to an application entitled "APPARATUS AND METHOD FOR DETERMINING POSITION INFORMATION OF MOBILE STATION", filed in the Korean Intellectual Property Office on Aug. 14, 2002 and assigned Serial No. 2002-47981, the contents of which are hereby incorporated by reference.

BACKGROUND OF THE INVENTION

1. Field of the Invention

The present invention relates to an apparatus and method for determining position information of a mobile station (i.e., a mobile terminal), and more particularly to an apparatus and method for determining position information of a mobile station by controlling a mobile communication system to detect a propagation delay error.

2. Description of the Related Art

Currently, there is a need to detect the position mobile terminals in order to provide personal safety and increase personal business use. The Federal Communication Committee (FCC) has provided a method for allowing a mobile terminal and a mobile service system to estimate their position information. A plurality of international telecommunication standardization organizations have also provided methods in their standards as requirements for a mobile terminal, such that it is expected that such a method will be applicable to domestic mobile terminals and mobile communication systems.

Two methods have been developed for determining position information of a mobile terminal, i.e., a method for adapting a general signal for use in a mobile communication network, and a method for adapting signals created from a Global Positioning System (GPS) satellite developed by the US Department of Defense. There are a variety of signals obtainable from a mobile communication network, for example, a Time Of Arrival (TOA) signal for measuring a difference between propagation transmission times, a Time Difference of Arrival (TDOA) signal for measuring a difference between propagation transmission times of two base stations, and an Angle of Arrival (AOA) signal for measuring an arrival angle of a propagation signal, etc. An apparatus for calculating position information of a mobile terminal receives the above signals at the same time and detects distance and angle information between the mobile terminal and the base station in such a way that it can approximately determine a position of the mobile terminal using a triangular survey. A mobile terminal having a GPS chipset recognizes its own position using the GPS chipset, informs the base station of the recognized position information in such a way that it can estimate or determine its own correct position.

However, the aforementioned conventional apparatus where the mobile terminal adapts a GPS satellite signal to estimate its own position has the following disadvantages. Namely, because a navigation message created by the GPS satellite signal contains a low transfer rate and information associated with several satellites, it contains a large amount of information. Therefore, a long initial starting time is needed to determine position information of a mobile terminal assuming the system is initialized. In addition, the aforementioned conventional apparatus has a reception signal having a low signal strength so that it cannot create a high-strength signal for determining position information of the mobile terminal, resulting in difficulty in determining position information of the mobile terminal. The conventional apparatus typically determines a position of a mobile terminal upon receiving a request from a user instead of successively tracking the position of the mobile terminal, such that it consumes a long initial synchronization time to determine the position of the mobile terminal and cannot quickly determine the position of the mobile terminal. The mobile terminal adapts a battery as a power supply to guarantee its own mobility. However, it should be noted that the battery may be fully discharged prior to checking position information of the mobile terminal.

Therefore, there has recently been proposed a method for adapting a GPS satellite over a predetermined network. This method receives orbital information of the GPS satellite over a wireless network such as a mobile communication network at a high transfer rate, such that it can quickly find a GPS satellite signal and can enhance a possibility of determining a correct position of a mobile terminal. However, in order to acquire the correct position information of the mobile terminal even in a specific area covered by an essentially insufficient number of satellites, for example, an urban area where large and high buildings and numerous houses are densely crowded, it is preferable for a GPS signal to be combined with a mobile communication network signal.

According to the above conventional method for determining position information of the mobile terminal using either only the mobile communication network signal or both the mobile communication network signal and the GPS signal, individual signals (e.g., TOA, TDOA, and AOA signals) obtainable from the mobile communication network have high delay errors caused by terrestrial propagation transmission due to propagation attributes such as reflection, diffraction, and refraction. Specifically, the propagation signal is reflected, diffracted, and refracted due to buildings or topographic objects located between a base station and a mobile terminal, resulting in a large delay error. Particularly, the method for detecting specific time information such as TOA and TDOA signals compares a signal transmission time with a signal reception time to calculate the distance between the mobile terminal and the base station, resulting in an error proportional to a length of a propagation transmission path. Preferably, such time difference information can be acquired by a cross correlation between orthogonal Pseudorandom Noise (PN) codes. This method uses time difference information to calculate position information of a mobile terminal using a least-square method without considering a propagation delay error. Although the range of measuring the position of the mobile terminal is extended, the propagation delay error is unavoidably contained in an estimated position value of the mobile terminal in determining the position of the mobile terminal, resulting in a high position error due to deflection characteristics. In other words, it is difficult for the above conventional method to acquire desired accuracy of position information due to a difference in propagation environments.

SUMMARY OF THE INVENTION

It is an object of the present invention to provide an apparatus and method for directly estimating a propagation delay error by measuring the signal strength information of a propagation signal for use in a mobile communication system, and reducing a position error of a mobile terminal (i.e., a mobile station (MS)).

It is another object of the present invention to provide an apparatus and method for reducing a position error of a MS by combining a propagation signal for a mobile communication system with a Global Positioning System (GPS) signal.

It is yet another object of the present invention to provide an apparatus and method for reducing a position error of a MS upon receipt of only a propagation signal for use in a mobile communication system.

In accordance with one embodiment of the present invention, the above and other objects can be substantially accomplished by providing an apparatus for receiving Mobile Station (MS) position acquisition signals from the mobile communication system in order to estimate position information of the MS, comprising: a position signal acquisition unit for receiving the MS position acquisition signals, acquiring a position signal from the received MS position acquisition signal, and outputting an acquired position signal; a primary position calculator for calculating a primary position using the acquired position signal received from the position signal acquisition unit; a propagation delay error range setup unit for determining a propagation delay error range using the acquired position signal; a propagation delay error estimator for estimating a propagation delay error using the determined propagation delay error range and the primary position; and a position calculator for calculating a secondary position using the propagation delay error estimation value and the calculated primary position.

Preferably, the propagation delay error range setup unit may determine the propagation delay error range using a signal stream composed of the MS position acquisition signals acquired by a signal received from the MS and arrangement information of a plurality of nearby Base Stations (BSs) of the MS. Preferably, the propagation delay error range setup unit may measure signal strength information of a propagation signal communicated between Base Stations (BSs) of the mobile communication system and the MS, and may determine the propagation delay error range by interpreting the measured signal strength information as a path loss function depending on propagation path information. Preferably, the propagation delay error range setup unit may contain a digital map database (DB) storing position information of Base Stations (BSs) of the mobile communication system, may track a propagation transmission path in response to the acquired position signal of the MS using information stored in the digital map DB, and may statistically determine a propagation delay error range.

Preferably, the propagation delay error estimator may select a value for minimizing a resultant value J(b) of a following Equation $J(b)=w^T Q_w^{-1} w = (z-S \cdot b)^T Q_w^{-1}(z-S \cdot b)$ from among a plurality of values contained in the determined propagation delay error range, and may determine the selected predetermined value to be an estimated propagation delay error.

In accordance with another embodiment of the present invention, there is provided an apparatus for receiving Mobile Station (MS) position acquisition signals from the mobile communication system, and receiving a reference signal from a satellite in order to estimate position information of the MS, comprising: a position signal acquisition unit for receiving the MS position acquisition signals, acquiring a position signal from the reference signal received from the satellite, and outputting an acquired position signal; a primary position calculator for calculating a primary position using the acquired position signal received from the position signal acquisition unit; a propagation delay error range setup unit for determining a propagation delay error range using the acquired position signal; a propagation delay error estimator for estimating a propagation delay error using the determined propagation delay error range and the primary position; and a position calculator for calculating a secondary position using the propagation delay error estimation value and the calculated primary position.

In accordance with yet another embodiment of the present invention, there is provided a method for receiving MS position acquisition signals from a mobile communication system, receiving a reference signal from a satellite, and estimating position information of the MS, comprising the steps of: a) receiving the MS position acquisition signals from the mobile communication system, acquiring a position signal from the received MS position acquisition signal, outputting an acquired position signal, and calculating a primary position using the acquired position signal; b) determining a propagation delay error range using the acquired position signal; c) estimating a propagation delay error using the determined propagation delay error range and the calculated primary position; and d) calculating a secondary position using the primary position and the estimated propagation delay error, and interpreting the calculated secondary position as estimated position information of the MS.

Preferably, the step (b) may comprise the sub-step of: b1) determining the propagation delay error range using a signal stream composed of the MS position acquisition signals acquired by a signal received from the MS and arrangement information of a plurality of nearby Base Stations (BSs) of the MS. Preferably, the step (b) may further comprises the sub-steps of: b2) measuring signal strength information of a propagation signal communicated between Base Stations (BSs) of the mobile communication system and the MS; and b3) determining the propagation delay error range by interpreting the measured signal strength information as a path loss function depending on propagation path information. Preferably, the step (b) may further comprise the sub-steps of: b4) containing a digital map database (DB) storing position information of Base Stations (BSs) of the mobile communication system; b5) tracking a propagation transmission path in response to the acquired position signal of the MS using information stored in the digital map DB; and b6) statistically determining a propagation delay error range.

Preferably, the step (c) may comprise the sub-steps of: c1) selecting a value for minimizing a resultant value J(b) of a following Equation $J(b)=w^T Q_w^{-1} w = (z-S \cdot b)^T Q_w^{-1}(z-S \cdot b)$ from among a plurality of values contained in the determined propagation delay error range; and c2) determining the selected predetermined value to be an estimated propagation delay error.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Embodiments of the present invention will be described in detail with reference to the accompanying drawings. In the drawings, the same or similar elements are denoted by the same reference numerals. A detailed description of known functions and configurations incorporated herein will be omitted for conciseness.

A position determination system for a mobile station (MS), upon receiving a mobile communication network signal, does not consider a delay error undesirably created during a propagation transmission time, resulting in low accuracy of position information. Therefore, a conventional position determination method should reduce the influence of a propagation delay error depending on terrestrial propagation environments populated with buildings or topographic objects in such a way that it solves the deflection problem and increases accuracy of position information. The present invention directly estimates the propagation delay error using a variety of methods, and removes an error from a measurement signal in such a way that it reduces the influence of a delay error. The present invention provides a variety of methods for determining an allowable range of a delay error with respect to output signals of individual base stations in order to estimate a propagation delay error. After acquiring the allowable range of the propagation delay error, a propagation delay error needed to acquire correct position information in association with more than two signals needed to perform such a position determination procedure is estimated within the acquired allowable range using either a linear optimization scheme or a limited optimization scheme. Individual vectors of estimated propagation delay errors are respectively applied to a correction term of the position determination procedure, such that position information of a MS can be accurately calculated as compared to a conventional method. In more detail, a MS or a Position Determination Entity (PDE) includes a Position Calculation Function (PCF) having an algorithm for setting up a propagation delay error range and another algorithm for optimally estimating a propagation delay error within a predetermined estimation range associated with multiple measurements.

Figure 1:
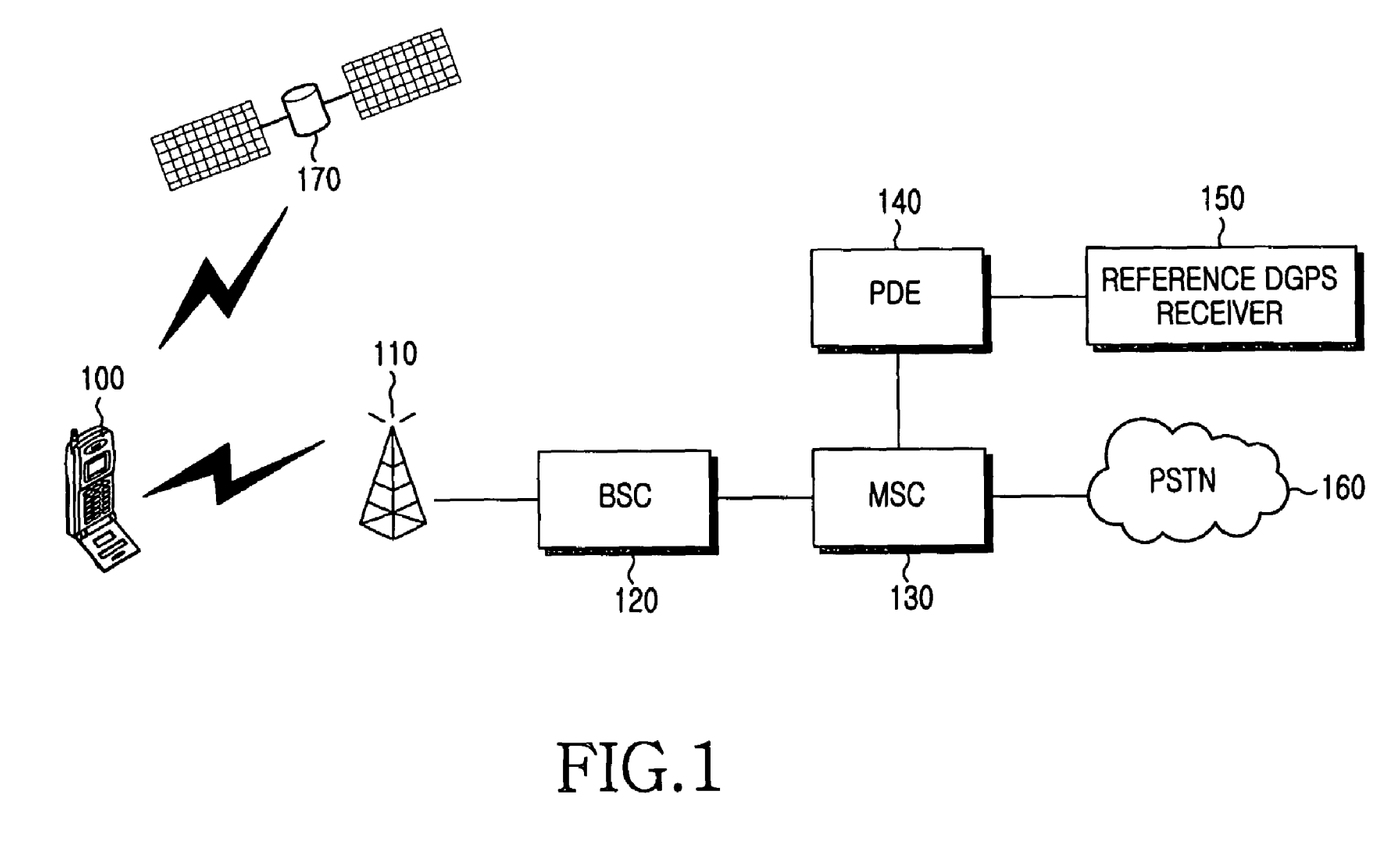
FIG. 1 is a block diagram of an example of a network configuration of a mobile communication network, a position determination system, and a GPS satellite in accordance with an embodiment of the present invention.

FIG. 1 is a block diagram illustrating an example of a network configuration of a mobile communication network, a position determination system, and a GPS satellite in accordance an embodiment of the present invention. Connection relationship between individual systems, their associated operations and their signal flow descriptions will herein be described with reference to FIG. 1.

A system for determining a position of a MS 100 using a GPS satellite 170 and a mobile communication network signal is shown in FIG. 1. The MS 100 can be any one of a cellular phone, a PCS phone, and a Personal Digital Assistant (PDA) capable of wirelessly receiving voice and other data over a network or a combination thereof. The MS 100 is a mobile terminal capable of receiving a GPS satellite signal. The MS can receive a variety of information from the GPS satellite 170, for example, current time information, satellite Identification (ID) information, and satellite position information, etc. The MS 100 receives voice data or a data provision service from a Base Station (BS) 110 over a wireless link. The BS 110 is connected to a Base Station Controller (BSC) 120, and transmits a signal to be transmitted to the MS 100 or other signal to be received from the MS 100 to a Mobile Switching Center (MSC) 130, such that the MSC 130 transmits received signals to a Public Switched Telephone Network (PSTN) 160. The MSC 130 is connected to the PSTN 160, and is connected to a Position Determination Entity (PDE) 140. The PDE 140 performs control operations for determining the MS 100's position depending on the number of signals received from the MS 100. The PDE 140 is connected to a reference Differential GPS (DGPS) receiver 150 for receiving a reference signal from the GPS satellite 170. The GPS satellite 170 is adapted to determine the MS 100's position.

The PDE 140 uses different position determination algorithms according to the number of GPS satellite signals that are obtainable from the MS 100 and the GPS satellite 170. When determining the MS 100's position, the MS 100 requests current GPS time information, GPS satellite ID information, and position information of the GPS satellite from the PDE 140 connected to the MSC 130. If the requested information is applied to the MS 100, the MS 100 can obtain the desired measurements from a network signal such as a TOA, TDOA, or AOA signal. Also, the MS can recognize the signal strength of a propagation signal received from the BS 110.

However, the PDE 140 can quickly and correctly acquire a GPS signal from the reference DGPS receiver 150. If the PDE 140 is unable to perform a position determination process due to an insufficient number of GPS signals, the PDE 140 only uses a signal received from the MSC 130, or combines insufficient GPS information with a network signal to perform the position determination process. Although the aforementioned embodiment of the present invention provides that the position determination process is executed in the PDE 140, the MS 100 can also correctly determine its own position assuming the MS 100 can receive the aforementioned signals.

Figure 2:
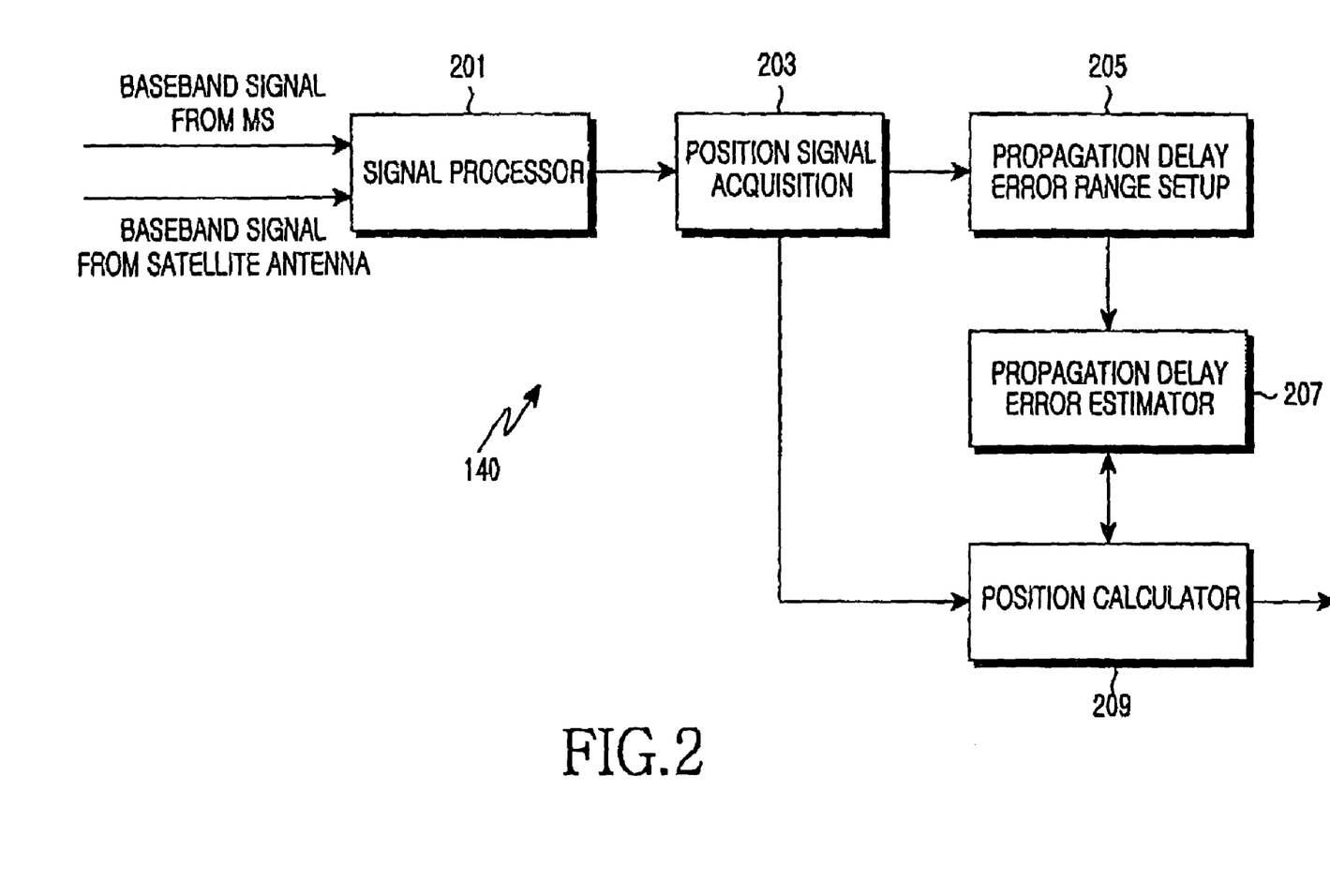
FIG. 2 is a block diagram of an example of a position determination entity of the position determining system shown in FIG. 1 in accordance with an embodiment of the present invention.

FIG. 2 is a block diagram of an example of components of the PDE 140 in accordance with an embodiment of the present invention. Overall configurations and operations of the PDE 140 will herein be described with reference to FIG. 2.

Referring to FIG. 2, the PDE 140 receives a baseband signal received from the MS 100 from the MSC 130. The baseband signal is adapted to estimate the MS 100's position. The baseband signal received from the MSC 130 may adapt a Round Trip Delay (RTD) signal and a pilot channel signal to estimate the MS 100's position. The reference DGPS 150 converts a satellite signal received from the GPS satellite 170 into a baseband signal. The PDE 140 receives the baseband-formatted satellite signal from the reference DGPS receiver 150. The signal received from the reference DGPS receiver 150 may be a position signal determined by the GPS satellite 170.

In an embodiment of the present invention, the BS 110 may receive such a signal via a multi-antenna such as a smart antenna, and may also use one whip antenna. The baseband signal received from this satellite antenna and the other baseband signal received from the MS 100 are applied to a signal processor 201. The signal processor converts the baseband signal into a digital signal, and the digital signal is then transmitted to a position signal acquisition unit 203. The position signal acquisition unit 203 calculates a (PR) Pseudo Range using a received signal of the satellite antenna. One or at least two of TOA, TDOA, and AOA signals communicable between the BS 110 and the MS 100 are acquired using a pilot signal for use in a mobile communication system. The TOA and TDOA signals can be calculated in either the BS 110 or the BSC 120 and the AOA signal can be calculated in the BSC 120, such that the calculated TOA, TDOA, and AOA signals can also be acquired from the BS 110 or the BSC 120.

The position signal acquisition unit 203 performs the above calculations on the PR, TOA, TDOA and AOA signals, provides one or at least two of the PR, TOA, TDOA and AOA signals to a primary position calculator of the position calculator 209, receives one or at least two of the TOA, TDOA and AOA signals, and provides the received signal or signals to a propagation delay error range setup unit 205. The propagation delay error range setup unit 205 determines a propagation delay error range from the received signal. The range of the propagation delay error is determined using the following three methods.

Figure 5:
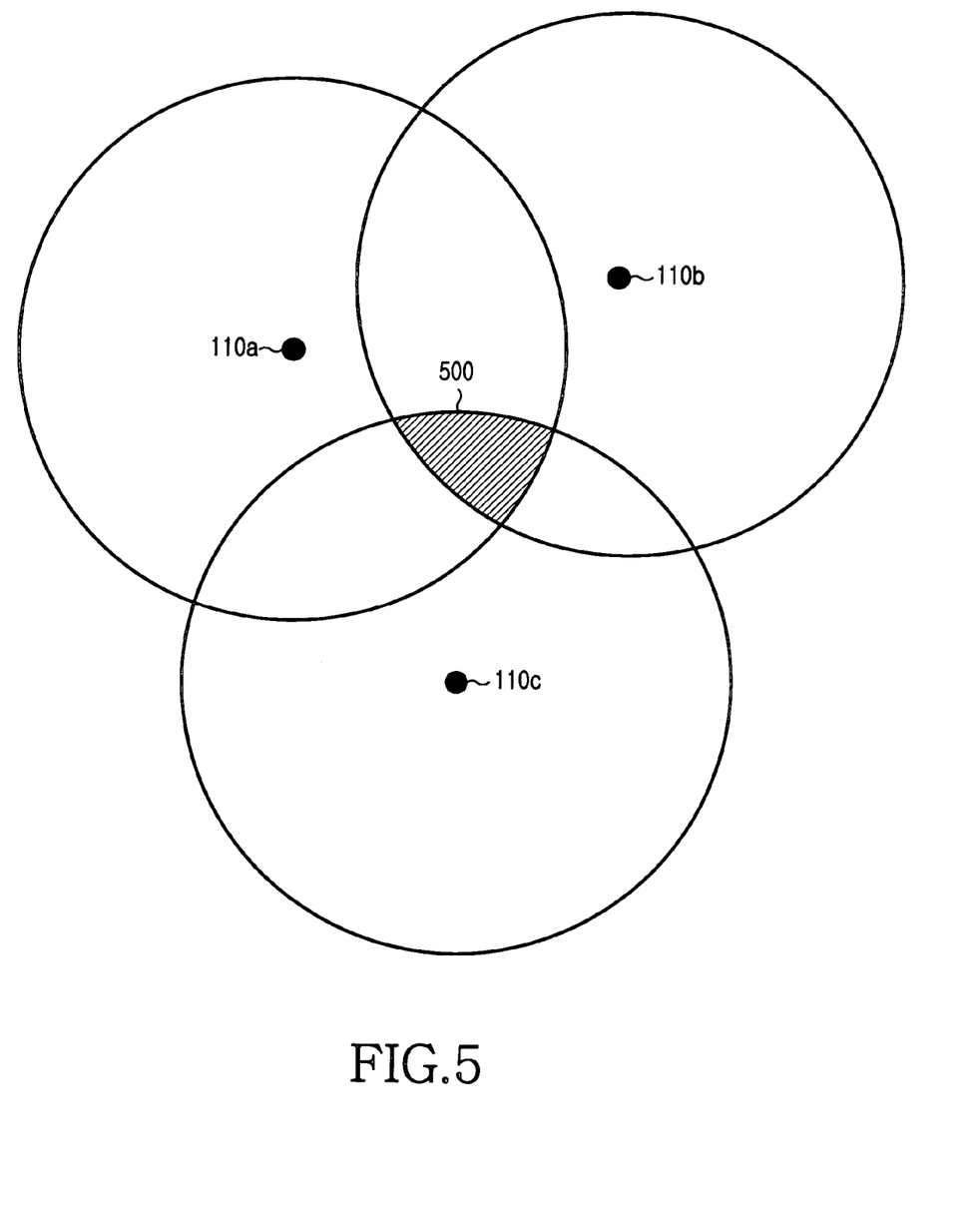
FIG. 5 is a diagram illustrating an example of a range of estimating position information for the mobile terminal on the basis of distance information calculated by a predetermined signal transferred from a plurality of base stations to the mobile terminal in order to estimate position information of the mobile terminal in accordance with an embodiment of the present invention.

A first method determines an error range using a measurement signal stream, i.e., a signal stream composed of TOA, TDOA, and AOA signals, available in every enabled communication zone and arrangement information of nearby BSs 110a, 110b, and 110c of the MS 100, as shown in FIG. 5.

A second method determines an error range using a path loss function incurring an attenuation phenomenon caused by a current propagation path when the signal strength information of a propagation signal transferred either from the BS 110 to the MS 100 or from the MS 100 to the BS 110 is available.

A third method statistically determines an error range by tracking a propagation transmission path on a map when a digital map database (DB) is adapted between the BS 110 and the MS 100.

If the propagation delay error range is determined using one or more methods from among the above three methods, the propagation delay error range setup unit 205 outputs a setup error range to the propagation delay error estimator 207. The propagation delay error estimator 207 estimates an error upon receiving an output signal from the propagation delay error range setup unit 205.

The above propagation delay error estimation process executed in the propagation delay error estimator 207 can estimate a propagation delay error using one or more methods from among the above three methods. In this case, the propagation delay error estimation process is executed according to the above three methods, and detailed explanations will herein be disclosed.

Provided that the first method is adapted to the propagation delay error estimator 207, the propagation delay error estimator 207 receives a primary position solution calculated by the primary position calculator contained in a position calculator 209 which combines a GPS signal available for a satellite to track the MS 100's position with a mobile communication network signal, and compares the received primary position solution with the stream of measurement signals such as TOA, TDOA, and AOA signals, such that the degree of deflection of individual signals deflected by the propagation delay error can be recognized. The degree of deflection is called a residual, and the square of the residual is called a cost function. In this case, estimation values of propagation delay errors contained in individual signals creating a minimum cost function can be recalculated using an optimization method.

The propagation delay error estimation process is comprised of two optimum estimation steps using an allowable range setup scheme and a limited optimization scheme. The propagation delay error estimator 207 calculates the allowable range of the propagation delay error upon receiving statistical amount information of the stream of TOA, TDOA, and AOA measurement signals. The propagation delay error estimator 207 calculates individual ranges of observable TOA and TDOA signals using a primary solution calculated by pre-stored position information of the BS 110 and MS 100. In this case, the primary solution is primarily calculated by the primary position calculator contained in the position calculator 209, and is applied to the propagation delay error estimator 207. Provided that the length of TOA or TDOA signal created by a line of sight path located between the MS 100 and the BS 110 is set to "T_t", an upper limit of "T_t" is set to "T_u", and a lower limit of "T_t" is set to "T_l", "T_t" created by the line of sight path can be denoted by the following Equation 1.

$$T\_l < T\_t < T\_u \qquad \text{[Equation 1]}$$

In the meantime, the propagation delay error range setup unit 205 receives more than two streams of TOA and TDOA measurement signals from the BS 110, and can acquire mean length and standard deviation information of individual signals. Provided that the mean length of a signal obtained from the TOA and TDOA measurement signal stream is set to "T_m", and the standard deviation of the signal acquired from the TOA and TDOA measurement signal stream is set to "T_s", a detection value containing a propagation delay error received from the BS 110 can be denoted by the following Equation 2.

$$T\_m-(k \times T\_s) < T\_t+b < T\_m+(k \times T\_s) \qquad \text{[Equation 2]}$$

With reference to the above Equation 2, k is a positive(+) constant for determining a reliable data range, and b is a propagation delay error. Therefore, provided that a real distance between the BS 110 and the MS 100, i.e., a distance between the TOA and TDOA signals due to an NLOS (Non-Line of Sight) distance, is set to "T_o", "T_o" can be denoted by the following Equation 3.

$$T\_o = T\_t + b \qquad \text{[Equation 3]}$$

Therefore, as can be seen from the above Equations 1~3, the range of the propagation delay error "b" can be estimated using the following Equation 4 in association with signals received from the BS 110.

$$\min(T\_o, T\_m-(k \times T\_s))-T\_u < b < \max(T\_o, T\_m+(k \times T\_s))-T\_l \qquad \text{[Equation 4]}$$

With reference to the above Equation 4, "T_u" and "T_l" indicating the range of a TOA or TDOA signal can be estimated using prestored position information of the BS 110 and a primary estimation solution. Provided that the propagation signal strength and the digital map DB are available, and the above information is combined and is calculated using an iteration method, the deflection error "b" can be more accurately estimated.

The second method for adapting propagation signal strength information to estimate a propagation delay error will hereinafter be described. It should be noted that a method for adapting a path loss function calculated by the propagation signal strength information to estimate the propagation delay error can also be adapted to determine a propagation delay error range. The propagation signal strength information measured by the MS 100 or the BS 110 is inversely proportional to the square (i.e., $A^2$) of a distance A between the MS 100 and the BS 110. However, provided that an environment having an Non-Line of Sight (NLOS) path is given, the propagation signal strength information is inversely proportional to fourth power (i.e., $A^4$) of the distance A. In this way, provided that the propagation signal strength inversely proportional to $A^4$ can be recognized using any one of Okumura model, Hata model, and COST231 model, etc., the propagation delay error range can be estimated using one of the above models.

Finally, the third method for adapting a prescribed database (DB) to calculate a propagation delay error range will hereinafter be described. According to the third method, the position calculator 140 contains a map DB having position and height information for many buildings. In this case, propagation reflection and diffraction information can be estimated using a ray-tracing scheme. This ray-tracing scheme has been frequently adapted to a typical network design, such that its detailed description will herein be omitted for the convenience of description. The ray-tracing scheme can acquire a highly accurate propagation transmission path depending on accuracy and reliability of information stored in the map DB, such that it is considered to be the best method for acquiring the most accurate propagation delay error range. Particularly, if the map DB includes three-dimensional building information, the third method uses not only planar propagation diffraction and reflection information but also vertical propagation diffraction and reflection information, resulting in the shortest propagation distance. The longest propagation distance is also adapted to determine the propagation delay error range along with the shortest propagation distance. Therefore, if the map DB having position and height information of buildings is contained in the position calculator 140, the third method adapts an urban block model having a simple structure to perform the ray-tracing scheme and acquire real-time position information.

When either one of the above three methods is adapted to estimate a propagation delay error range, the propagation delay error estimation range "b" is located between the lower limit "b_l" and the upper limit "b_u" as shown in the following Equation 5.

$$b\_l < b < b\_u \quad \text{[Equation 5]}$$

The propagation delay error range setup unit 205 estimates a propagation delay error contained in individual signals creating a minimum cost function within the propagation delay error allowable range denoted by the Equation 5. The propagation delay error range setup unit 205 typically adapts an optimization technique to perform such a propagation delay error estimation process. A limited optimization equation containing a limited range can be established with respect to TOA or TDOA measurement acquired in a forward link or downlink direction or in a reverse link or uplink direction from M number of BSs. Provided that the measurement vector is set to "r", the measurement vector "r" can be denoted by the following Equation 6.

$$r = h(x) + b + v \quad \text{[Equation 6]}$$

With reference to the Equation 6, h(x) serving as a MS position function is a TOA or TDOA value between the BS and the MS, b is a propagation delay error corresponding to a deflection error, and v is a white noise.

Provided that a measurement equation is set up as shown in the Equation 6, a primary solution is calculated by the least-square method for calculating an optimum estimation value providing the least-square error, and a term indicating a propagation delay error is disregarded during a calculation time of the primary solution. Therefore, provided that the primary solution is set to "x1", "x1" can be denoted by the following Equation 7.

$$x1 = (H^T R^{-1} H)^{-1} H^T R^{-1} (r - h(x_0) + H x_0) \quad \text{[Equation 7]}$$

With reference to the Equation 7, H is a scoring matrix created by performing a linear process on h(x) using a prescribed condition of $x = x_0$, $H^T$ is a transpose matrix, $R^{-1}$ is a covariance, and $x_0$ is an initial reference point.

In the Equation 7, the primary solution x1 disregards the deflection error term, and h(x) is linearly processed on the basis of the reference point $x_0$ according to the Taylor series. In this way, in case of linearly processing h(x) on the basis of the reference point $x_0$, this linear process of h(x) is denoted by $H = \partial h(x)/\partial x | x = x_0$. The primary solution x1 contains a deflection error 'b', such that it is slightly deflected from a real error. Provided that a difference between a real measurement and an estimation value is called residual information 'z' in consideration of the acquired propagation delay error estimation range, the optimization equation can be represented by the following Equation 8.

$$\begin{aligned} z &= (r - h(x_0) + H x_0) - H x_1 \quad \text{[Equation 8]} \\ &= (Hx + v + b) - H x_1 \leftarrow \text{bias applied} \\ &= Hx + v + b - H(x_2 - vb) \\ &= (I + Hv)b + H(x - x_2) + v \end{aligned}$$

With reference to the Equation 8, a constant matrix S(=I+Hv) is multiplied by b, and this multiplication result is added to w(=H(x−x$_2$)+v). Therefore, a minimum w is needed to reduce a propagation delay error range. A cost minimization calculation equation for reducing the propagation delay error range using a cost minimization value can be represented by the following Equation 9.

$$J(b) = w^T Q_w^{-1} w = (z - S \cdot b)^T Q_w^{-1} (z - S \cdot b) \quad \text{[Equation 9]}$$

With reference to the Equation 9, J(b) is adapted to acquire such a cost minimization value associated with b, w, is an error of a residual z, $w^T$ is a transpose matrix of w, and z is a residual calculated by the primary position solution, resulting in z=(r−h(x$_0$)+Hx$_0$)−H•x1. S is a matrix indicating a correlation between z and a measured deflection error b, and $Q_w$ is a covariance matrix. Therefore, the optimization process can be performed when the deflection error b for minimizing a resultant value of the Equation 9 is recognized. A prescribed equation for minimizing the result of the Equation 9 can be represented by the following Equation 10.

$$\min J(b) = (z - S \cdot b)^T Q_w^{-1} (z - S \cdot b) \text{ subject to } b_i \in \{b\_l, b\_u\}, i = 1, 2, 3, \ldots, m \quad \text{[Equation 10]}$$

With reference to the Equation 10, S can be denoted by the following Equation 11.

$$S = I - H(H^T R^{-1} H)^{-1} H^T R^{-1} \quad \text{[Equation 11]}$$

With reference to the Equation 11, I is an identity matrix, H is a line of sight matrix between the BS and the MS, $H^T$ is a transpose matrix, and R is a covariance of individual measurements.

A resultant value calculated by the Equation 11 is equal to a propagation delay error estimation value to compensate for the primary position solution. In this case, the propagation delay error estimation value is calculated by the propagation delay error estimator 207. The primary position solution is compensated using the propagation delay error value calculated by the propagation delay error estimator 207 in such a way that the last position of the MS can be recognized. In more detail, an estimation value b_hat for minimizing the result of the Equation 11 can be determined using a linear optimization technique considering a limited range.

The position calculator 209 can calculate a secondary solution using the estimation value calculated by the propagation delay error estimator 207. Provided that the primary position solution is set to x1 and the estimated propagation delay error is set to b_hat, the secondary position solution denoted by the following Equation 12 can be finally acquired from a correction matrix V geometrically calculated between the BS 110 and the MS 100.

$$x2 = x1 + V \cdot b\_hat \quad \text{[Equation 12]}$$

With reference to the Equation 12, x2 is a secondary position solution created by the position calculator 209. The geometrically-calculated correction matrix V contained in the Equation 12 is represented by the following Equation 13.

$$V = -(H^T R^{-1} H)^{-1} H^T R^{-1} \quad \text{[Equation 13]}$$

Upon receipt of a correction value calculated by the propagation delay error estimator 207 according to the Equation 11, the position calculator 209 corrects the primary solution x1 received from the primary position calculator in such a way that a corrected position calculation is performed.

Figure 3:
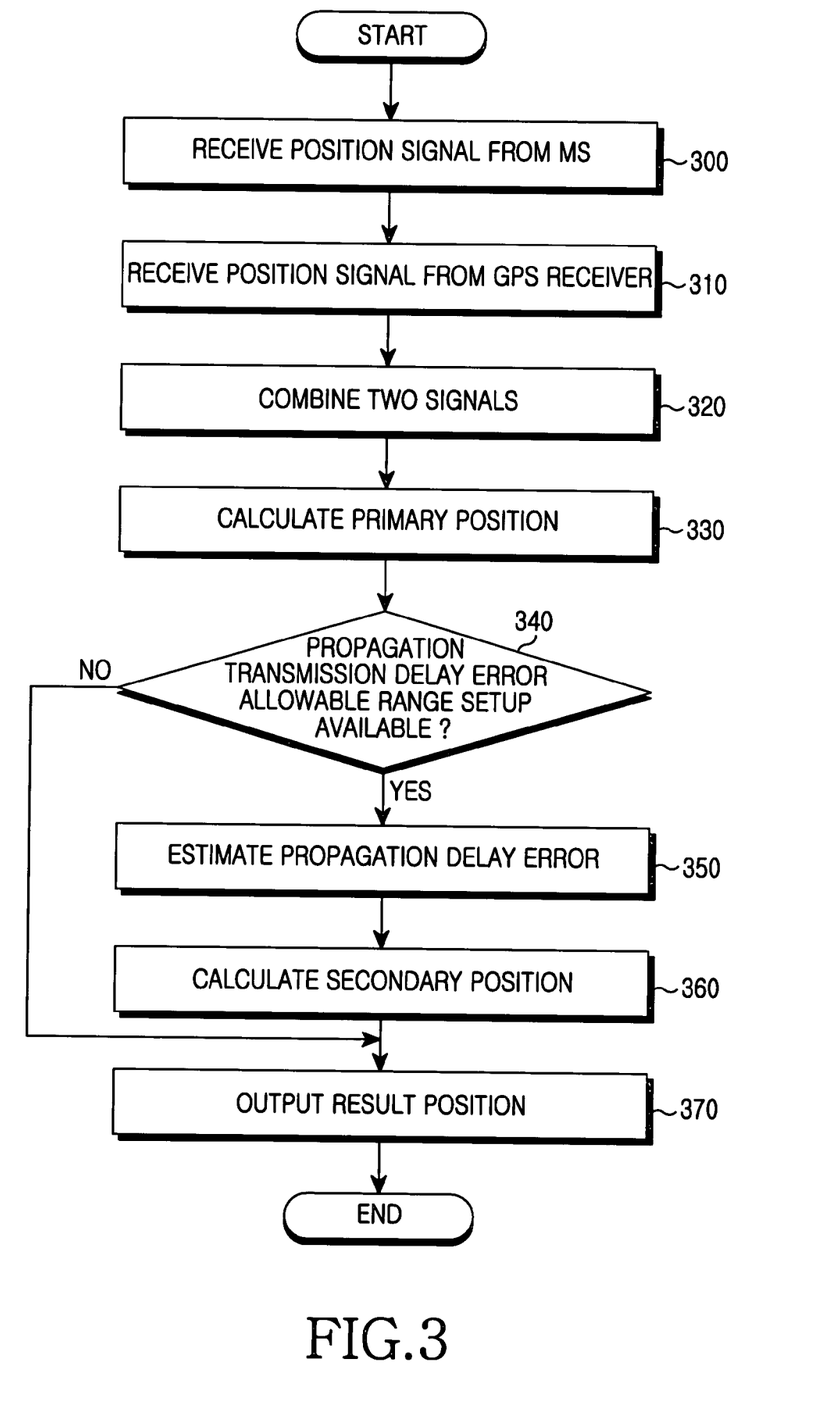
FIG. 3 is a flow chart illustrating an example of a position determination procedure for the position determination system in accordance with an embodiment of the present invention.

FIG. 3 is a flow chart illustrating an example of a position determination procedure for the Position Determination Entity (PDE) in accordance with an embodiment of the present invention. Control operations of the PDE will now be described with reference to FIGS. 2~3.

Figure 4:
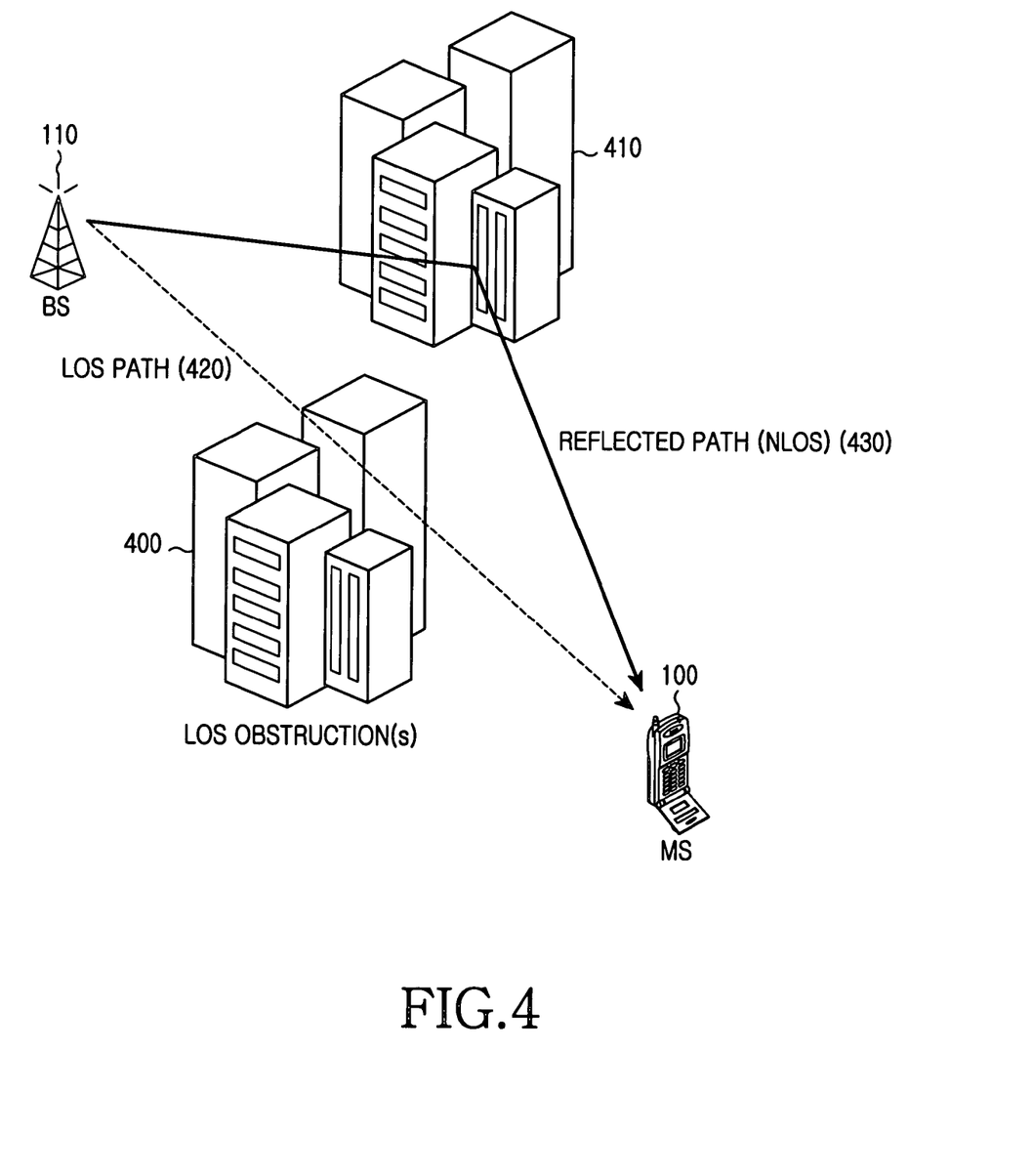
FIG. 4 is a block diagram illustrating an example of a propagation transmission path of a transmission signal transferred from a base station to a mobile terminal in accordance with an embodiment of the present invention.

The PDE 140 receives one or more position signals, for example, one or at least two of TOA, TDOA, and AOA signals, from the MS 100 at step 300. A detailed description of the PDE 140 will hereinafter be disclosed with reference to FIG. 4. FIG. 4 is a block diagram illustrating an example of a propagation transmission path of a signal transferred from the BS 110 to the MS 100 in accordance with an embodiment of the present invention. If the BS 110 adapts a smart antenna to transmit a signal to the MS 100, it transmits a beam signal to a predetermined zone containing the MS 100 using a beam forming method. If the smart antenna is not adapted to such a signal transmission process, the BS 110 controls the beam signal to have a predetermined signal strength capable of being received at the MS 100, and then transmits the beam signal to the MS 100. In this way, if there is no obstacle to the signal transferred from the BS 110, the signal of the BS 110 is transferred to the MS 100 over a Line of Sight (LOS) path shown by reference number 420 of FIG. 4. However, provided that the MS 100 is located in an urban area, the signal is rarely transferred directly from the BS 110 to the MS 100. Therefore, the signal transferred from the BS 110 is reflected, refracted, and diffracted, and is then transmitted to the MS 100 over a Non-Line of Sight (NLOS) path, as shown by reference number 430 of FIG. 4. Although only one NLOS path is shown in FIG. 4, the signal is actually transmitted from the BS 110 to the MS 100 over multiple NLOS paths.

Therefore, a typical signal measured between the BS 110 and the MS 100 essentially contains an error component. A pilot signal or an RTD signal can be adapted as a position measurement signal transferred from the BS 110 to the MS 100. When using the RTD signal, a signal transmission time consumed from the BS 110 to the 110 can be detected without a system processing time consumed in the MS 100 and the BS 110.

Position information can be detected from at least two BSs in order to recognize more accurate position information of the MS 100. As shown in FIG. 5, individual BSs 110a, 110b, and 110c can detect position information of the MS 100 using any one of the aforementioned methods. FIG. 5 is a diagram illustrating an example of a range of estimating position information of the MS on the basis of distance information calculated by a predetermined signal transferred from a plurality of BSs to the MS to estimate position information of the mobile MS in accordance with an embodiment of the present invention.

In this case, no LOS path exists between the MS 100 and the BSs 110a, 110b, and 110c, such that a prescribed area 500 shown in FIG. 5 is contained in a position area of the MS 100. An angle created between the MS 100 and each of the BSs 110a, 110b, and 110c can be checked using signals received from the BSs 110a, 110b, and 110c.

Referring to FIG. 3, the signal processor 201 of the PDE 140 receives a signal from the MS 100 at step 300, performs a digital signal process on the received signal, and transmits a resultant digital signal to the position signal acquisition unit 203. The position signal acquisition unit 203 acquires one or at least two of TOA, TDOA, and AOA signals using the received digital signal. The signal processor 201 of the PDE 140 receives a position signal from the reference DGPS receiver 150 at step 310, performs a digital process on the received position signal, and transmits a resultant signal to the position signal acquisition unit 203 in such a way that the position signal acquisition unit 203 recognizes satellite position information. Although the above steps 300 and 310 are sequentially performed as shown in FIG. 3, the steps 300 and 310 can also be performed simultaneously.

If the position signal acquisition unit 203 of the PDE 140 recognizes the MS 100's position information and satellite position information using one of the above methods, the two signals are combined at step 320, and a combined result signal is transferred to the primary position calculator contained in the position calculator 209. The primary position calculator contained in the position calculator 209 calculates the primary solution using the least-square method.

The position calculator 209 determines whether a propagation delay error allowable range can be established at step 340. Specifically, it is determined at step 340 whether the position calculator 209 receives a predetermined signal indicating an enabled correction mode from the position signal acquisition unit 203. If the position calculator 209 determines the enabled correction mode, it calculates a primary position solution, and waits for a correction value's reception. The propagation delay error estimator 207 receives the primary position solution from the primary position calculator contained in the position calculator 209 at step 350, receives an output signal of the propagation delay error range setup unit 205, estimates a propagation delay error, and outputs the estimated propagation delay error to a secondary position calculator contained in the position calculator 209.

If the propagation delay error is estimated at step 350, then the secondary position calculator contained in the position calculator 209 calculates a secondary position solution (i.e., the last position information) denoted by the Equation 12 at step 360. Thereafter, the position calculator 209 outputs position calculation result data at step 370.

As apparent from the above description, the embodiment of the present invention described directly above estimates a propagation delay error, and compensates for the estimated propagation delay error, resulting in increased accuracy of position information of the MS. In order to increase the accuracy of the MS position information, the present invention determines a propagation delay error having an allowable range using three methods, estimates a propagation delay error providing the minimum cost function using a proper optimization technique within the allowable range, and then corrects the estimated propagation delay error during a position calculation process, so that the position of the MS can be quickly and accurately determined. Furthermore, when only a mobile communication network signal is adapted to estimate the propagation delay error, or when the mobile communication network signal is combined with a GPS signal to estimate the propagation delay error, the present invention contributes to the increased accuracy of the MS position.

Although the embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for receiving Mobile Station (MS) position acquisition signals from the mobile communication system in order to estimate position of the MS, comprising:
    a position signal acquisition unit for receiving the MS position acquisition signals, acquiring a position signal from the received MS position acquisition signal, and outputting an acquired position signal;
    a primary position calculator for calculating a primary position using the signal received from the position signal acquisition unit;
    a propagation delay error range setup unit for determining a propagation delay error range using the acquired position signal;
    a propagation delay error estimator for estimating a propagation delay error using the determined propagation delay error range and the primary position; and
    a position calculator for calculating a secondary position using the propagation delay error estimation value and the calculated primary position.

2. The apparatus as set forth in claim 1, wherein the propagation delay error range setup unit determines the propagation delay error range using a signal stream composed of the MS position acquisition signals acquired by a signal received from the MS and arrangement information of a plurality of nearby Base Stations (BSs) of the MS.

3. The apparatus as set forth in claim 1, wherein the propagation delay error range setup unit measures signal strength information of a propagation signal communicated between Base Stations (BSs) of the mobile communication system and the MS, and determines the propagation delay error range by interpreting the measured signal strength information as a path loss function depending on propagation path information.

4. The apparatus as set forth in claim 1, wherein the propagation delay error range setup unit contains a digital map database (DB) storing position information of Base Stations (BSs) of the mobile communication system, tracks a propagation transmission path in response to the acquired position signal of the MS using information stored in the digital map DB, and statistically determines a propagation delay error range.

5. The apparatus as set forth in claim 1, wherein the propagation delay error estimator selects a value for minimizing a resultant value J(b) of a following Equation J(b) $=w^T Q_w^{-1} w = (z-S\bullet b)^T Q_w^{-1}(z-S\bullet b)$ from among a plurality of values contained in the determined propagation delay error range, and determines the selected value to be an estimated propagation delay error.

6. The apparatus as set forth in claim 1, wherein the position signal corresponds to one of a Time of Arrival (TOA) signal, a Time Difference of Arrival (TDOA) signal, and an Angle of Arrival (AOA) signal.

7. The apparatus as set forth in claim 1, wherein the position signal corresponds to at least two of a Time of Arrival (TOA) signal, a Time Difference of Arrival (TDOA) signal, and an Angle of Arrival (AOA) signal.

8. The apparatus as set forth in claim 1, wherein the propagation delay error range is determined using mean value and standard deviation information of a Time of Arrival (TOA) signal or a Time Difference of Arrival (TDOA) signal.

9. An apparatus for receiving Mobile Station (MS) position acquisition signals from the mobile communication system, and receiving a reference signal from a satellite in order to estimate position information of the MS, comprising:
    a position signal acquisition unit for receiving the MS position acquisition signals, acquiring a position signal from the reference signal received from the satellite, and outputting an acquired position signal;
    a primary position calculator for calculating a primary position using the acquired position signal received from the position signal acquisition unit;
    a propagation delay error range setup unit for determining a propagation delay error range using the acquired position signal;
    a propagation delay error estimator for estimating a propagation delay error using the determined propagation delay error range and the primary position; and
    a position calculator for calculating a secondary position using the propagation delay error estimation value and the calculated primary position.

10. The apparatus as set forth in claim 9, wherein the propagation delay error range setup unit determines the propagation delay error range using a signal stream composed of the MS position acquisition signals acquired by a signal received from the MS and arrangement information of a plurality of nearby Base Stations (BSs) of the MS.

11. The apparatus as set forth in claim 9, wherein the propagation delay error range setup unit measures signal strength information of a propagation signal communicated between Base Stations (BSs) of the mobile communication system and the MS, and determines the propagation delay error range by interpreting the measured signal strength information as a path loss function depending on propagation path information.

12. The apparatus as set forth in claim 9, wherein the propagation delay error range setup unit contains a digital map database (DB) storing position information of Base Stations (BSs) of the mobile communication system, tracks a propagation transmission path in response to the acquired position signal of the MS using information stored in the digital map DB, and statistically determines a propagation delay error range.

13. The apparatus as set forth in claim 9, wherein the propagation delay error estimator selects a predetermined value for minimizing a resultant value J(b) of a following Equation $J(b)=w^T Q_w^{-1} w=(z-S\bullet b)^T Q_w^{-1}(z-S\bullet b)$ from among a plurality of values contained in the determined propagation delay error range, and determines the selected predetermined value to be an estimated propagation delay error.

14. The apparatus as set forth in claim 9, wherein the position signal corresponds to one of a Time of Arrival (TOA) signal, a Time Difference of Arrival (TDOA) signal, and an Angle of Arrival (AOA) signal.

15. The apparatus as set forth in claim 9, wherein the position signal corresponds to at least two of a Time of Arrival (TOA) signal, a Time Difference of Arrival (TDOA) signal, and an Angle of Arrival (AOA) signal.

16. The apparatus as set forth in claim 9, wherein the propagation delay error range is determined using mean value and standard deviation information of a Time of Arrival (TOA) signal or a Time Difference of Arrival (TDOA) signal.

17. A method for receiving MS position acquisition signals from a mobile communication system, receiving a reference signal from a satellite, and estimating position of the MS, comprising the steps of:
  a) receiving the MS position acquisition signals, acquiring a position signal from the received MS position acquisition signal, outputting an acquired position signal, and calculating a primary position using the acquired position signal;
  b) determining a propagation delay error range using the acquired position signal;
  c) estimating a propagation delay error using the determined propagation delay error range and the calculated primary position; and
  d) calculating a secondary position using the primary position solution and the estimated propagation delay error, and interpreting the calculated secondary position as estimated position of the MS.

18. The method as set forth in claim 17, wherein the step (b) comprises the sub-steps of:
  b1) determining the propagation delay error range using a signal stream composed of the MS position acquisition signals acquired by a signal received from the MS and arrangement information of a plurality of nearby Base Stations (BSs) of the MS.

19. The method as set forth in claim 17, wherein the step (b) further comprises the sub-steps of:
  b2) measuring signal strength information of a propagation signal communicated between Base Stations (BSs) of the mobile communication system and the MS; and
  b3) determining the propagation delay error range by interpreting the measured signal strength information as a path loss function depending on propagation path information.

20. The method as set forth in claim 17, wherein the step (b) further comprises the sub-steps of:
  b4) containing a digital map database (DB) storing position information of Base Stations (BSs) of the mobile communication system;
  b5) tracking a propagation transmission path in response to the acquired position signal of the MS using information stored in the digital map DB; and
  b6) statistically determining a propagation delay error range.

21. The method as set forth in claim 17, wherein the step (c) comprises the sub-steps of:
  c1) selecting a value for minimizing a resultant value J(b) of a following Equation $J(b)=w^T Q_w^{-1} w=(z-S\bullet b)^T Q_w^{-1}(z-S\bullet b)$ from among a plurality of values contained in the determined propagation delay error range; and
  c2) determining the selected value to be an estimated propagation delay error.

22. The method as set forth in claim 17, further comprising the step of:
  e1) receiving the reference signal from the satellite, wherein the primary position and the secondary position are calculated using the reference signal received from the satellite and the acquired position signal.

* * * * *